US012236266B2

(12) United States Patent
Kwon et al.

(10) Patent No.: US 12,236,266 B2
(45) Date of Patent: Feb. 25, 2025

(54) BATTERY MANAGEMENT SYSTEM AND CONTROLLING METHOD THEREOF

(71) Applicant: LG ENERGY SOLUTION, LTD., Seoul (KR)

(72) Inventors: Jung Hyun Kwon, Daejeon (KR); Chan Ha Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 530 days.

(21) Appl. No.: 17/616,501

(22) PCT Filed: Jul. 17, 2020

(86) PCT No.: PCT/KR2020/009469
§ 371 (c)(1),
(2) Date: Dec. 3, 2021

(87) PCT Pub. No.: WO2021/101012
PCT Pub. Date: May 27, 2021

(65) Prior Publication Data
US 2022/0237029 A1    Jul. 28, 2022

(30) Foreign Application Priority Data
Nov. 19, 2019    (KR) .................. 10-2019-0148979

(51) Int. Cl.
*G06F 9/48*    (2006.01)
*G06F 9/52*    (2006.01)
(Continued)

(52) U.S. Cl.
CPC .............. *G06F 9/4881* (2013.01); *G06F 9/52* (2013.01); *G06F 11/3409* (2013.01); *H01M 10/4207* (2013.01)

(58) Field of Classification Search
CPC ...... G06F 9/4881; G06F 9/52; G06F 11/3409; G06F 2209/484; G06F 9/4887; G06F 9/4818
See application file for complete search history.

(56) References Cited

U.S. PATENT DOCUMENTS 9,063,780 B2    6/2015  Nader
2001/0015818 A1*  8/2001  Kawanabe ............... B41J 2/165
                                                         358/1.15
(Continued)

FOREIGN PATENT DOCUMENTS

CN    105917311 A    8/2016
CN    106371903 A    2/2017
(Continued)

OTHER PUBLICATIONS

Extended European Search Report dated Jul. 5, 2022 issued by the European Patent Office in corresponding European Patent Application No. 20889720.7.
(Continued)

*Primary Examiner* — Tuan C Dao
(74) *Attorney, Agent, or Firm* — MORGAN, LEWIS & BOCKIUS LLP

(57) ABSTRACT

A battery management system in which each of a plurality of battery management systems performs an individual task and transmits results of the tasks to a master battery management system wirelessly, the battery management system including: a task information storage unit including a list of tasks performed by each of the plurality of battery management systems, the performance time, performance cycle, and work priority of each task included in the list of tasks, and the communication priority among the plurality of battery management systems, a schedule determination unit configured to determine a work schedule on the basis of data stored in the task information storage unit, and a priority changing (Continued)

unit configured to adjust the work priority of a task based on the work schedule determined by the schedule determination unit, wherein the schedule determination unit is further configured to adjust the work schedule according to the adjusted work priority.

19 Claims, 24 Drawing Sheets

(51) Int. Cl.
*G06F 11/34* (2006.01)
*H01M 10/42* (2006.01)

(56) References Cited

U.S. PATENT DOCUMENTS

| | | | |
|---|---|---|---|
| 2003/0067935 A1 | 4/2003 | Hosein | |
| 2004/0224684 A1* | 11/2004 | Dorsey | H04W 48/16 455/437 |
| 2005/0036466 A1* | 2/2005 | Malik | H04L 47/10 370/468 |
| 2007/0011661 A1* | 1/2007 | Itoh | G06F 9/485 717/127 |
| 2007/0034680 A1* | 2/2007 | Gomes | G06Q 20/1085 235/379 |
| 2008/0030770 A1* | 2/2008 | Nishioka | G06F 3/1288 358/1.15 |
| 2008/0109114 A1* | 5/2008 | Orita | H02J 7/00047 901/50 |
| 2010/0100708 A1* | 4/2010 | Ukai | G06F 9/3851 712/205 |
| 2010/0162253 A1* | 6/2010 | Jeong | G06F 9/4881 718/102 |
| 2011/0196692 A1* | 8/2011 | Chavez, Jr. | B60L 53/665 700/297 |
| 2011/0216787 A1 | 9/2011 | Ai et al. | |
| 2012/0159501 A1 | 6/2012 | Lee et al. | |
| 2012/0268069 A1 | 10/2012 | Park et al. | |
| 2014/0269477 A1* | 9/2014 | Snyder | H04W 52/0216 370/311 |
| 2015/0205632 A1 | 7/2015 | Gaster | |
| 2015/0273693 A1* | 10/2015 | Cohen | B25J 13/006 901/47 |
| 2015/0277982 A1* | 10/2015 | Iwata | G06F 9/505 718/103 |
| 2015/0318701 A1* | 11/2015 | vor dem Esche | H02J 3/30 307/19 |
| 2016/0062429 A1* | 3/2016 | Cudak | G06F 1/263 713/300 |
| 2016/0098292 A1* | 4/2016 | Boutin | G06F 9/4881 718/104 |
| 2017/0010918 A1* | 1/2017 | Sato | G06F 9/5027 |
| 2017/0185511 A1* | 6/2017 | Chiu | G06F 3/0643 |
| 2019/0096724 A1 | 3/2019 | Zhang | |
| 2021/0366287 A1* | 11/2021 | Lee | G06Q 10/04 |

FOREIGN PATENT DOCUMENTS

| | | |
|---|---|---|
| CN | 110162399 A | 8/2019 |
| JP | 8-16410 A | 1/1996 |
| JP | 2001-249821 A | 9/2001 |
| JP | 2001-350639 A | 12/2001 |
| JP | 4309269 B2 | 8/2009 |
| JP | 5212956 B2 | 6/2013 |
| JP | 2017-182627 A | 10/2017 |
| JP | 6237042 B2 | 11/2017 |
| JP | 2018-112928 A | 7/2018 |
| JP | 2019-35123 A | 3/2019 |
| KR | 10-1245279 B1 | 3/2013 |
| KR | 10-1682412 B1 | 12/2016 |
| KR | 10-1871468 B1 | 6/2018 |
| KR | 10-1898929 B1 | 9/2018 |

OTHER PUBLICATIONS

Qingyu Meng et al., "Dynamic Task Scheduling for the Uintah Framework", e-Health Networking, Applications and Services, 2006, Healthcom 2006, 8th International Conference on New Delhi, India, Aug. 17-19, 2006, Piscataway, NJ, USA, IEEE, Nov. 15, 2010, pp. 1-10, XP031858569, ISBN: 978-1-4244-9704-1.

Dingchao Li et al., "Exploiting Heterogeneous Parallelism in the Presence of Communication Delays", Conference Proceedings of the 1998 International Conference on Supercomputing, Melbourne, Australia, Jul. 13-17, 1998; [ACM International Conference on Supercomputing], New York, NY : ACM, US, Jul. 13, 1998, pp. 157-164, XP058123302, DOI: 10.1145/277830.277862, ISBN: 978-0-89791-998-2.

International Search Report issued in corresponding International Patent Application No. PCT/KR2020/009469 dated Sep. 28, 2020.

Office Action dated Jul. 24, 2024 issued in Chinese Patent Application No. 202080039022.2.

* cited by examiner

| DEVICE | TASK | PRIORITY | TOTAL PERFORMANCE TIME | WORK PERFORMANCE TIME | COMMUNICATION TIME | CYCLE |
|---|---|---|---|---|---|---|
| MBMS | TASK A | 1 | 50ms | 30ms | 5ms | 100ms |
|  | TASK B | 2 | 25ms | 10ms | 5ms | 100ms |
|  | TASK C | 3 | 5ms | 5ms |  | 100ms |
| BMS#1 | TASK A | 1 | 50ms | 30ms | 5ms | 100ms |
|  | TASK B | 2 | 25ms | 10ms | 5ms | 100ms |
|  | TASK E | 5 | 20ms | 20ms |  | 100ms |
| BMS#2 | TASK A | 1 | 50ms | 30ms | 5ms | 100ms |
|  | TASK B | 2 | 25ms | 10ms | 5ms | 100ms |
|  | TASK D | 4 | 5ms | 5ms |  | 100ms |
| BMS#3 | TASK A | 1 | 50ms | 30ms | 5ms | 100ms |
|  | TASK E | 5 | 20ms | 20ms |  | 100ms |
|  | TASK F | 6 | 15ms | 15ms |  | 100ms |

<TASK TIMETABLE>

FIG.6

| DEVICE | TASK A | TASK B |
|---|---|---|
| MBMS | 4 | 3 |
| BMS#1 | 1 | 1 |
| BMS#2 | 2 | 2 |
| BMS#3 | 3 | |

<COMMUNICATION PRIORITY TABLE>

FIG.7

| DEVICE | TASK | PRIORITY | WORK PERFORMANCE TIME | COMMUNICATION TIME | CYCLE |
|---|---|---|---|---|---|
| MBMS | TASK A | 1 | 40ms | 5ms | 100ms |
| | TASK B | 2 | 10ms | 5ms | 100ms |
| | TASK C | 3 | 5ms | | 100ms |
| BMS#1 | TASK A | 1 | 40ms | 5ms | 100ms |
| | TASK B | 2 | 10ms | 5ms | 100ms |
| | TASK F | 6 | 5ms | | 100ms |
| | TASK G | 7 | 15ms | | 100ms |
| | TASK H | 8 | 10ms | | 100ms |
| BMS#2 | TASK A | 1 | 40ms | 5ms | 100ms |
| | TASK B | 2 | 10ms | 5ms | 100ms |
| | TASK D | 4 | 10ms | | 100ms |
| | TASK E | 5 | 10ms | | 100ms |
| BMS#3 | TASK A | 1 | 40ms | 5ms | 100ms |
| | TASK B | 2 | 10ms | 5ms | 100ms |
| | TASK D | 4 | 10ms | | 100ms |
| | TASK E | 5 | 10ms | | 100ms |

FIG.11

| DEVICE | TASK A | TASK B |
|--------|--------|--------|
| MBMS | 4 | 4 |
| BMS#1 | 1 | 1 |
| BMS#2 | 2 | 2 |
| BMS#3 | 3 | 3 |

<COMMUNICATION PRIORITY TABLE>

FIG.12

| DEVICE | TASK | PRIORITY | WORK PERFORMANCE TIME | COMMUNICATION TIME | CYCLE |
|---|---|---|---|---|---|
| MBMS | TASK A | 1 | 40ms | 5ms | 100ms |
| | TASK B | 2 | 10ms | 5ms | 100ms |
| | TASK C | 3 | 5ms | | 100ms |
| BMS#1 | TASK A | 1 | 40ms | 5ms | 100ms |
| | TASK B | 2 | 10ms | 5ms | 100ms |
| | TASK F | 6 | 20ms | | 100ms |
| | TASK G | 7 | 20ms | | 100ms |
| BMS#2 | TASK A | 1 | 40ms | 5ms | 100ms |
| | TASK B | 2 | 10ms | 5ms | 100ms |
| | TASK D | 4 | 10ms | | 100ms |
| | TASK E | 5 | 10ms | | 100ms |
| BMS#3 | TASK A | 1 | 40ms | 5ms | 100ms |
| | TASK B | 2 | 10ms | 5ms | 100ms |
| | TASK D | 4 | 10ms | | 100ms |
| | TASK E | 5 | 10ms | | 100ms |

FIG.19

BATTERY MANAGEMENT SYSTEM AND CONTROLLING METHOD THEREOF

CROSS-REFERENCE TO RELATED APPLICATIONS

This application claims the benefit of Korean Patent Application No. 10-2019-0148979, filed on Nov. 19, 2019, in the Korean Intellectual Property Office, the disclosure of which is incorporated herein in its entirety by reference.

TECHNICAL FIELD

Embodiments of the present invention relate to a battery management system and a controlling method thereof.

BACKGROUND ART

With the generalization of portable electronic devices such as smart phones and tablets, research and development on chargeable/dischargeable secondary batteries are being actively conducted with the spread of electric vehicles and energy storage devices. A lithium ion battery in particular among secondary batteries has an advantage in that the energy density thereof is much higher than that of typical Ni/Cd batteries, Ni/MH batteries, and the like. Also, a lithium ion battery can be manufactured small and lightweight, and thus, is used as a power source of mobile devices. In addition, a lithium ion battery has attracted attention as a next generation energy storage medium since the range of use thereof has been expanded to being a power source of electric vehicles.

A secondary battery such as a lithium-ion battery is used in the form of a battery module including a cell module in which a plurality of battery cells are connected in series and/or in parallel and a battery management system (BMS) for controlling the charge/discharge of the cell module. In addition, a secondary battery may be used in the form of a battery pack in which a plurality of battery modules are coupled according to an output specification required by an object on which the battery is mounted. In addition, a battery management system for managing the entire battery pack may be additionally provided as a master battery management system.

A battery system composed of a plurality of battery modules may include a master battery management system and a plurality of slave battery management systems. The master battery management system is capable of controlling and managing the operation of the plurality of slave battery management systems and communicating with a higher-level system. The master battery management system and the plurality of slave battery management systems transmit and receive signals wirelessly. Therefore, there is a need for a lot of research to perform wireless communication efficiently and stably among battery management systems.

DISCLOSURE OF THE INVENTION

Technical Problem

An aspect of the present invention provides a method in which each battery management system may efficiently use limited resources in a battery system in which a plurality of battery management systems communicate wirelessly.

Technical Solution

According to an aspect of preset invention, a battery management system in a system in which each of a plurality of battery management systems performs a task individually set and transmits results of the performed tasks to a master battery management system via wireless communication includes a task information storage unit including a list of tasks performed by each of the plurality of battery management systems, the performance time, performance cycle, and work priority of each task included in the list of tasks, and the communication priority among the plurality of battery management systems, a schedule determination unit for determining a work schedule on the basis of data stored in the task information storage unit, and a priority changing unit for adjusting the work priority of a task on the basis of the work schedule determined by the schedule determination unit, wherein the schedule determination unit adjust the work schedule according to the adjusted work priority.

According to another aspect of preset invention, a control method of a battery management system includes storing a list of tasks performed by each of a plurality of battery management systems, the performance time, performance cycle, and work priority of each task included in the list of tasks, and the communication priority among the plurality of battery management systems, determining a work schedule on the basis of the stored data, adjusting the work priority of a task on the basis of the determined work schedule, and adjusting the work schedule according to the adjusted work priority.

Advantageous Effects

According to the above battery management system and control method thereof, it is possible to use limited resources efficiently. In addition, without changing hardware such as mycom, it is possible to perform tasks which have not been performed before.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

FIG. 6 is a diagram showing a task timetable according to an embodiment of the present invention;

FIG. 7 is a diagram showing a communication priority table according to an embodiment of the present invention;

FIG. 11 is a diagram showing a task timetable according to another embodiment of the present invention;

FIG. 12 is a diagram showing a communication priority table according to another embodiment of the present invention;

FIG. 19 is a diagram showing a task timetable according to another embodiment of the present invention;

MODE FOR CARRYING OUT THE INVENTION

Figure 1:
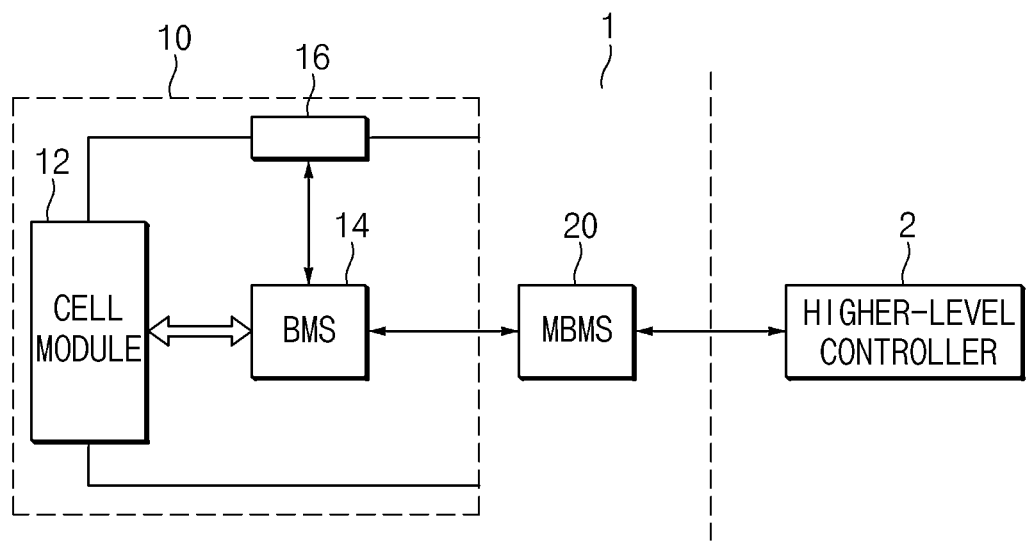
FIG. 1 is a configuration diagram schematically showing a battery system according to an embodiment of the present invention.

Hereinafter, various embodiments of the present invention will be described in detail with reference to the accompanying drawings. In the present document, like reference numerals are used for like elements throughout the drawings, and redundant descriptors of the like elements are omitted.

For the various embodiments of the present invention disclosed in the present document, specific structural to functional descriptions are merely illustrative of the present invention. The various embodiments of the present invention may be embodied in various forms and should not be construed as limited to the embodiments set forth herein.

Terms such as "a first," "a second," "first," and "second" used in various embodiments may modify various components regardless of the order and/or importance thereof, and do not limited the corresponding components. For example, a first component may be referred to as a second component without departing from the scope of the present invention, and similarly, a second component may also be referred to as a first component.

The terms used in this document are only used to describe specific embodiments, and may not be intended to limit the scope of other embodiments. Singular expressions may include plural expressions unless the context clearly indicates otherwise.

FIG. 1 is a configuration diagram schematically showing a battery system according to an embodiment of the present invention.

Referring to FIG. 1, a battery system according to the present invention may include a battery module 10 including a cell module 12 having a plurality of battery cells, a battery management system (hereinafter, referred to as 'BMS') 14, and a switching unit 16, and a master BMS 20 for controlling and managing the battery module 10.

The cell module 12 includes one or more chargeable/dischargeable battery cells. The battery cell may be a lithium-ion (Li-ion) battery, a lithium-ion (Li-on) polymer battery, a nickel-cadmium (Ni—Cd) battery, a nickel-hydrogen (Ni-MH) battery, and the like, but is not limited thereto.

The BMS 14 may control the operation of the switching unit 16 to control the charge/discharge of the cell module 12. In addition, the BMS 14 may monitor the cell module 12 and/or the voltage, current, temperature, and the like of each battery cell included in the cell module 12. In addition, for the monitoring by the BMS 14, a sensor or various measurement modules not illustrated may be additionally installed at the cell module 12, a charge/discharge path, or at any position of the cell module 12 and the like. The BMS 14 may calculate a parameter indicating the state of the cell module 12, for example, SOC, SOH, or the like, on the basis of measurement values of the monitored voltage, current, temperature, and the like.

The BMS 14 controls and manages the overall operation of the battery module 10. To this end, the BMS 14 may include various components such as a mycom which is a controller for executing programs and controlling the overall operation of the BMS 14, input/output devices such as sensors and measurement means, and other peripheral circuits.

BMS 14 is capable of communicating with the master BMS 20 wirelessly, and may transmit various measurement values of the monitored voltage, current, temperature, and the like, or calculation values of SOC, SOH, or the like to the master BMS 20. Particularly, the BMS 14 according to the present invention determines a work schedule which is the order of performance of tasks to be performed in consideration of various conditions. At this time, the various conditions may include work priority and performance time of tasks, communication time required to transmit data to the master BMS 20 or other BMSs, communication priority between the tasks and other BMSs, and the like. The determination of the work schedule and change thereof will be described in detail below.

The switching unit 16 is a semiconductor switching element for controlling current flow for the charge/discharge of the cell module 12, and for example, at least one MOS-FET may be used.

The battery module 10 may be provided in the form of the battery pack 1 including a plurality of the battery modules 10 according to the specifications of a device on which the battery module 10 is to be mounted. In addition, the battery pack 1 may include the master BMS 20 which controls and manages the battery module 10. The master BMS 20 may receive various data from the BMS 14 included in each battery module 10. The master BMS 20 may send to the BMS 14 included in each battery module 10 a signal for controlling the same.

In addition, the master BMS 20 may have no battery module 10 to separately manage. Alternatively, the master BMS 20 may be that any one BMS 14 included in each of the plurality of battery modules 10 plays a role as a master communication device.

Meanwhile, the master BMS 20 may be communicatively connected to an external higher-level controller 2. That is, the master BMS 20 of the battery pack 1 may send various data on the battery pack 1 to the higher-level controller 2 and may receive a control signal for the operation of the battery pack 1 from the higher-level controller 2. When the battery pack 1 is mounted on an electric vehicle, the higher-level controller 2 may be a vehicle controller for controlling the driving of the vehicle.

Figure 2:
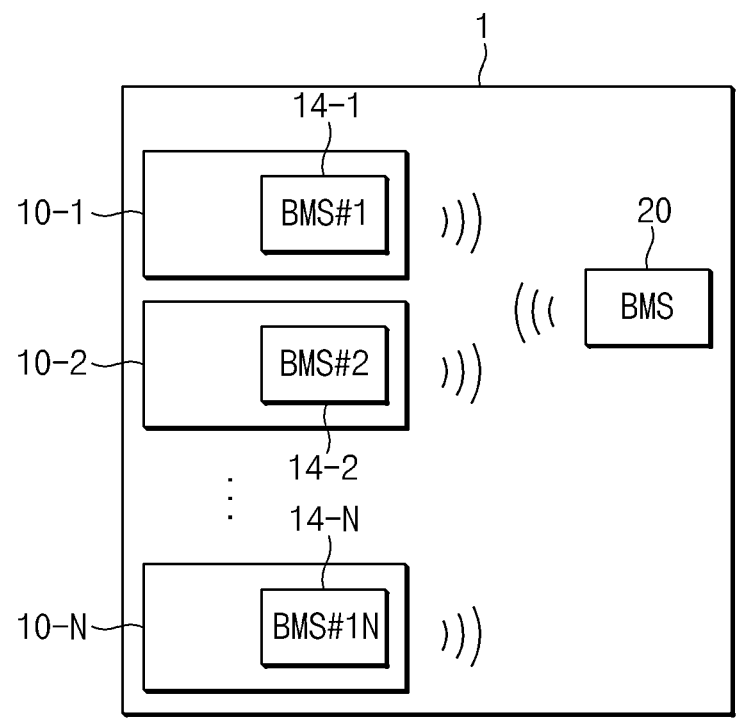
FIG. 2 is a configuration diagram of a battery pack including a battery management system according to an embodiment of the present invention.

FIG. 2 is a configuration diagram of a battery pack including a battery management system according to an embodiment of the present invention.

Referring to FIG. 2, the battery pack 1 includes a plurality of battery modules 10-1 to 10-N (wherein N is an integer of 1 or greater) and the master BMS 20 which controls and manages the same. The plurality of battery modules 10-1 to 10-N respectively include corresponding BMSs 14-1 to 14-N.

The master BMS 20 and each of the BMSs 14-1 to 14-N communicate with each other wirelessly.

The master BMS 20 is a control circuit of a battery module (battery module controller) and may be responsible for communication with the higher-level controller 2. However, when it is a small system without a higher-level controller, the master BMS 20 may be operated in an independent form without a higher-level controller.

The master BMS 20 uses various information obtainable from a sensor, such as the current voltage, temperature, and humidity of the battery pack 1 or the battery module 10 to perform various tasks to be performed by a BMS. The various tasks may include an operation of obtaining the various information from the sensor.

The BMSs 14-1 to 14-N, which are cell module controllers, perform voltage measurement, module voltage measurement, temperature measurement, humidity measurement, resistance measurement, and the like for the cell module 12, and convert information provided from the sensor through various measurements to fit the battery system to transmit the converted information to the master BMS 20, which is the upper control circuit.

In addition, the BMSs 14-1 to 14-N may perform corresponding operations according to commands for performing various operations such as cell balancing transmitted from the master BMS 20 or the higher-level controller 2.

As described above, the BMSs 14-1 to 14-N and the master BMS 20 which are communication nodes connected wirelessly in the system share a task table, and may perform some tasks by synchronizing time. However, when tasks are synchronized and performed as described above, IDLE time occurs in individual nodes due to reasons such as waiting for communication. As a result, the BMSs 14-1 to 14-N and the master BMS 20, which are nodes, cannot efficiently utilize their own resources, so that there is a possibility in that work efficiency is lowered than when the performance time of tasks is not synchronized. In addition, tasks which may be all processed if the performance time of the tasks is not synchronized may not be processed within a predetermined period of time.

Hereinafter, in order to solve the above problems, embodiments of the present invention capable of reconsidering work efficiency by adding a work scheduler to the BMSs 14-1 to 14-N and the master BMS 20 will be described. Specifically, the configuration and operation of the BMSs 14-1 to 14-N and the master BMS 20 in a system in which each of the plurality of BMSs 14-1 to 14-N and the master BMS 20 performs a task individually set and results of the performed tasks are transmitted to the master BMS 20 via wireless communication will be described.

When designing a wireless network protocol, tasks of a system using the corresponding protocol are already determined. In addition, due to the nature of an embedded system, all tasks which are determined should be performed within a predetermined time, and should not exceed a predetermined maximum time.

In addition, the operation method of a microprocessor MUC and the like is a sequential operation method according to work priority among tasks. The order is determined at the time of design, and is not modified during Runtime. In addition, there is idle time in a work schedule finally determined. When tasks are sequentially performed without the synchronization of the tasks due to the performance of a microprocessor, all the tasks may be performed within a predetermined time. However, when tasks are synchronized and performed, there are cases in which all the tasks may not be performed within a predetermined time.

The embodiments of the present invention have been made in view of the above situation.

Figure 3:
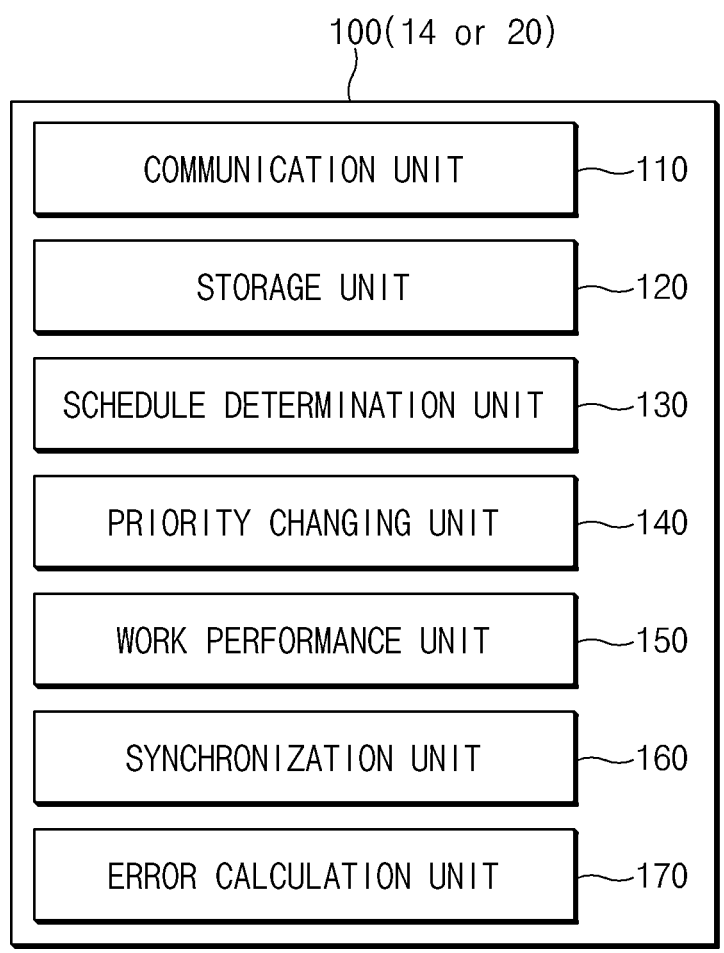
FIG. 3 is a functional block diagram showing the configuration of a battery management system according to an embodiment of the present invention.

FIG. 3 is a functional block diagram showing the configuration of a battery management system according to an embodiment of the present invention.

Referring to FIG. 3, a BMS 100 according to the present invention may include a communication unit 110, a storage unit 120, a schedule determination unit 130, a priority changing unit 140, a work performance unit 150, a synchronization unit 160, and an error calculation unit 170. Here, the BMS 100 may be the BMS 14 which is a slave node or the master BMS 20 which is a master node. Hereinafter, the BMS 14 which is a slave and the master BMS 20 will all be referred to as the BMS 100.

The communication unit 110 transmits and receives data and various signals with another BMS 100. That is, the communication unit 110 performs a function for the communication with another slave BMS 14 and the master BMS 20. The communication unit 110 may use various protocols such as wireless CAN communication, WIFI, Bluetooth, and Zigbee with another slave BMS 14 and master BMS 20.

The communication unit 110 may transmit a list of tasks performed by the same and the performance time, performance cycle, and work priority of each task included in the list of tasks to another BMS 14 and the master BMS 20 to share a task timetable with each other. In addition, the communication unit 110 may share a communication priority table showing the communication priority between another slave BMS 14 and master BMS 20. That is, the communication unit 110 may transmit data on the task timetable and the communication priority table to another BMS 100. In the same manner, the communication unit 110 may receive data on the task timetable and the communication priority table from another BMS 100.

In addition, the communication unit 110 may transmit results of a task performed by the same to the master BMS 20 and the like. At this time, when the priority of a work and accordingly the work schedule thereof have been changed by the priority changing unit 140 while performing a task, the communication unit 110 may transmit the corresponding changes to another BMS 100 to share the changes. In the same manner, the communication unit 110 may receive changes to the priority of a task and the work schedule thereof from another BMS 100.

The communication unit 110 may transmit signals and data in a multi-cast or broadcast manner. For example, the communication unit 110 may transmit a work schedule adjusted by the schedule determination unit 130 to another BMS 100 in a multi-cast or broadcast manner.

When meeting a predetermined condition, the communication unit 110 may perform communication for sharing a task timetable and a communication priority table. For example, when the system of a device on which the battery pack 1 is mounted wakes up, the communication unit 110 may perform the communication for sharing a task timetable and a communication priority table. When the device on which the battery pack 1 is mounted is an electric vehicle, the above condition may be starting the vehicle. Alternatively, the communication unit 110 may periodically perform the communication for sharing a task timetable and a communication priority table.

Furthermore, the communication unit 110 may receive the performance start signal, performance completion signal, and the like of a task for synchronization with other BMSs 100 at the time of performing the task.

The storage unit 120 stores various programs required for the operation of the BMS 100 and various data generating when the BMS 100 is operated. The storage unit 120 may store a task timetable including a list of tasks performed by each of a plurality of BMSs 100 in the battery pack 1 and the performance time, performance cycle, and work priority of each task included in the list of tasks. The storage unit 120 may store a communication priority table showing the communication priority among the plurality of BMSs 100 in the battery pack 1. Furthermore, the storage unit 120 may have tasks which are set to be performed in synchronization with another BMS 100 in the task list. In addition, when received the adjusted work schedule from another BMS 100 through the communication unit 110, the storage unit 120 may update stored contents of the task timetable, the communication priority table, and the like with the adjusted work schedule. That is, the storage unit 120 serves a function as a task information storage unit.

The schedule determination unit 130 determines a work schedule on the basis of stored data. Specifically, the schedule determination unit 130 determines the work schedule on the basis of contents of the task timetable and the communication priority table, which are data stored in the task information storage unit. The schedule determination unit 130 also determines the work schedule in consideration of setting information on tasks to be performed in synchronization with another BMS 100.

The work schedule refers to the order in which each task is performed and when to start and end each task to be performed.

When there is a change to the work priority of some tasks by the priority changing unit 140, the schedule determination unit 130 adjust the work schedule according to the adjusted work priority.

The priority changing unit 140 adjusts the work priority of a task on the basis of the work schedule determined by the schedule determination unit 130.

As an example, when there is a subordinated task which may be performed during a waiting time in the work schedule determined by the schedule determination unit 130, the priority changing unit 140 adjusts the work priority of the corresponding subordinated task to be after the work priority of a task to be performed just before the waiting time. The waiting time may refer to a period of time from when a specific task is performed before when results of the task are transmitted to another BMS 100. The waiting time may refer to a period of time during which the processor utilization rate of the corresponding BMS 100 is equal to or less than a reference value.

The priority changing unit 140 compares the length of the waiting time of the work schedule determined by the schedule determination unit 130 with the length of the performance time of each task to be performed after the waiting time. The priority changing unit 140 may perform the comparison of the waiting time and the performance time on tasks stored in a task queue 125 to be described later. Alternatively, the priority changing unit 140 may perform the comparison of the waiting time and the performance time on tasks included in the entire determined work schedule.

In addition, the priority changing unit 140 adjusts the work priority such that a task having a performance time shorter than the length of the waiting time is performed during the waiting time. At this time, as an example, when there are a plurality of tasks having a performance time shorter than the length of the waiting time, the priority changing unit 140 may adjust the work priority of a task having the highest work priority among the corresponding tasks. Alternatively, as another example, when there are a plurality of tasks having a performance time shorter than the length of the waiting time, the priority changing unit 140 may adjust the work priority of a task having the longest performance time among the tasks.

When the priority of a work and accordingly the work schedule thereof have been adjusted by the priority changing unit 140 as described above, the communication unit 110 may transmit the corresponding changes to another BMS 100 to share the changes.

The work performance unit 150 performs tasks to be performed by the same according to the work schedule determined by the schedule determination unit 130. When there is a task to be performed in synchronization with another BMS 100, the work performance unit 150 performs the task in synchronization. For example, for the synchronization, with respect to the performance start time of each task, the work performance unit 150 performs each task according to the start time thereof calculated by the synchronization unit 160. Therefore, it is possible to synchronize the work performance time with another BMS 100 which performs the same task.

The synchronization unit 160 uses the performance start signal and performance completion signal of a specific task and the task timetable received from the communication unit 110 to calculate the performance start time of the specific task. In addition, the synchronization unit 160 synchronizes the performance time of the corresponding task of each BMS 100 through the calculated performance start time.

The error calculation unit 170 uses time at which the performance start signal and performance completion signal of a specific task are received and the task timetable received from the communication unit 110 to calculate an error. For example, the error calculation unit 170 uses the difference in time at which the performance start signal of the specific task is received and time at which the performance completion signal thereof is received and the difference in performance time of the specific task on the task timetable to calculate an error and provides the error to the synchronization unit 160. When calculating the performance time of a first task, the synchronization unit 160 may reflect the calculated error.

By determining a work schedule as described above and performing an operation of changing the work priority of a task in the determined task schedule, the BMS 100 may efficiently utilize its own resources.

Hereinafter, a function of determining a work schedule and adjusting work priority will be described in more detail.

Figure 4:
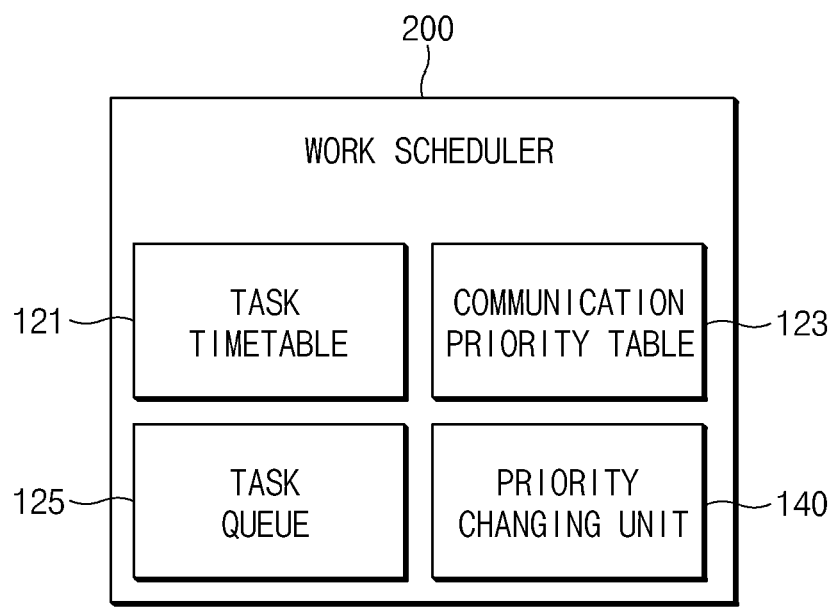
FIG. 4 is a functional block diagram showing a work scheduler in a battery management system according to an embodiment of the present invention.

FIG. 4 is a functional block diagram showing a work scheduler 200 in a battery management system according to an embodiment of the present invention.

The work scheduler 200 has a function to determine a work schedule and adjust work priority. The work scheduler 200 may include a task timetable 121, a communication priority table 123, the task queue 125, and the priority changing unit 140.

In the task timetable 121, as described above, a list of tasks to be performed by each BMS 100, which is a communication node, the order of the tasks, and the performance time, (if necessary) communication time, and performance cycle of each task are stored.

In the communication priority table 123, with respect to a task requiring communication, the communication priority among the BMSs 100 which perform the corresponding task is stored. The communication priority may be information allocated by the master BMS 20 when each node first joins a wireless communication network.

On the basis of the task time table 121 and the communication priority table 123, the work scheduler 200 knows in advance the list of tasks to be performed by each BMS 100, which is a communication node, the order of the tasks, and the performance timing of the tasks. At this time, the priority and order of performance of a task to be performed are determined, and the performance time thereof is almost constant. In addition, tasks typically have a structure to be performed repeatedly at a specific time (cycle).

The task queue 125 uses information which the work scheduler 200 has to identify a task to be performed on the basis of the work schedule determined by the schedule determination unit 130. In addition, tasks to be performed are sequentially called to be stored in the task queue 125.

As descried above, the priority changing unit 140 may adjust the work priority of a task according to predetermined criteria. The priority changing unit 140 may adjust the work priority recorded in the task timetable. Alternatively, the priority changing unit 140 may adjust the work priority of tasks included in the task queue 125 on the basis of the determined task schedule to change the order in the task queue 125. That is, among tasks excluding a task (a task currently being performed) having the highest work priority among tasks included in the task queue 125, the priority changing unit 140 may change the work priority of a task having a performance time shorter than a waiting time. When the task in which the work priority has been changed is completed, the priority changing unit 140 may change the work priority of the corresponding task back to the original work priority thereof.

Figure 5:
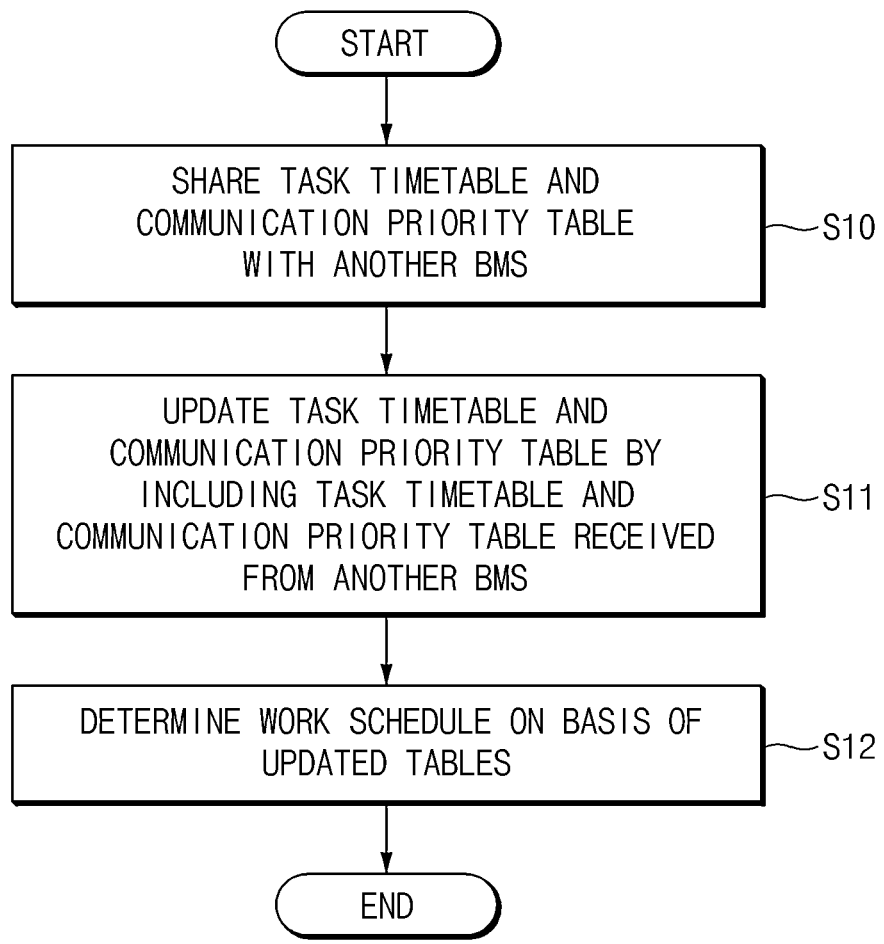
FIG. 5 is a flow chart showing the operation of a battery management system according to an embodiment of the present invention.

FIG. 5 is a flow chart showing the operation of a battery management system according to an embodiment of the present invention.

Referring to FIG. 5, first, the BMS 100 shares a task timetable and a communication priority table with another BMS S10. That is, through the communication unit 110, data required for making a task timetable and a communication priority table is transmitted to and received from another BMS 100.

The BMS 100 updates the task timetable and the communication priority table by including the task timetable and the communication priority table received from another BMS S11. That is, the BMS 100 generates a final task timetable 121 and a final communication priority table 123 in consideration of both data of its own and data of another BMS. That is, in the storage unit 120 of the BMS 100, the list of tasks performed by each of the plurality of BMSs 100 and the performance time, performance cycle, and work priority of each task included in the list of tasks, and the communication priority among the plurality of BMSs 100 may be stored in the form of the task timetable 121 and the communication priority table 123.

In addition, a work schedule is determined on the basis of the updated tables S12. That is, the work schedule is determined on the basis of data stored in the storage unit 120.

FIG. 6 and FIG. 7 show the task timetable 121 and the communication priority table 123 according to an embodiment of the present invention, which are stored in the storage unit 120 on the basis of the method described with reference to FIG. 5.

In the present example, the master BMS 20, which is a master node, and the BMSs 14-1 to 14-3, which are slave nodes, are included as communication nodes in a wireless communication network. In addition, the task timetable 121 may include a task list of each node, the priority among tasks included in the task list, the performance time and communication time of each task, and the like. In addition, the total performance time, which is the sum of work performance time and total communication time therefor, and the cycle of each task may be additionally included. The communication priority table 123 may include, with respect to a task requiring communication, the communication priority among the BMSs 100 which perform the corresponding task for each task.

According to FIG. 6, the master BMS 20 performs Tasks A, B, and C, and a BMS #1 14-1 performs Tasks A, B, and E. A BMS #2 14-2 performs Tasks A, B, and D, and a BMS #3 14-3 performs Tasks A, E, and F.

In addition, according to FIG. 7, for Task A, communication priority is given in the order of BMS #1→BMS #2→BMS #3→ the master BMS. For Task B, communication priority is given in the order of BMS #1→BMS #2→ the master BMS.

Figure 8:
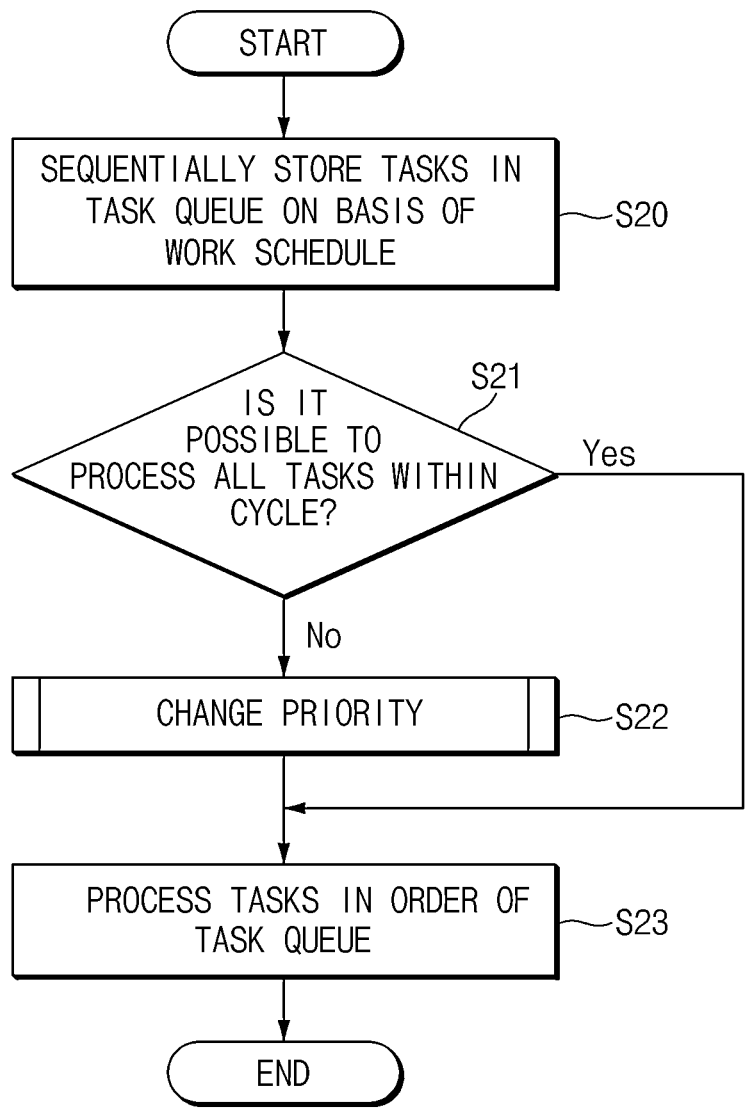
FIG. 8 is a flow chart showing a work scheduling operation of a battery management system according to an embodiment of the present invention.

FIG. 8 is a flow chart showing a work scheduling operation of a battery management system according to an embodiment of the present invention.

Referring to FIG. 8, as described with reference to FIG. 5, when the task timetable 121 and the communication priority table 123 are generated and stored, a work schedule is determined by the schedule determination unit 130. In addition, on the basis of the determined work schedule, tasks to be performed are sequentially stored in the task queue 125 S20.

Thereafter, whether it is possible to process all the tasks stored in the task queue 125 within a predetermined period of time, that is a cycle, is determined S21. If it is possible to process all the tasks within the predetermined period of time, (Yes in S21), the tasks are processed in the order of the task queue S23. That is, the tasks are processed according to the determined work schedule without the change in work priority.

On the other hand, if it is not possible to process all the tasks within the predetermined period of time, (No in S21), the work priority thereof is changed S22. Thereafter, the order of the task queue is changed on the basis of the changed work priority, and the tasks are processed in the order of the changed task queue S23.

That is, on the basis of the determined work schedule, when the tasks meet predetermined conditions, the work priority of the tasks is adjusted, and according to the adjusted work priority, the work schedule is adjusted.

Figure 9:
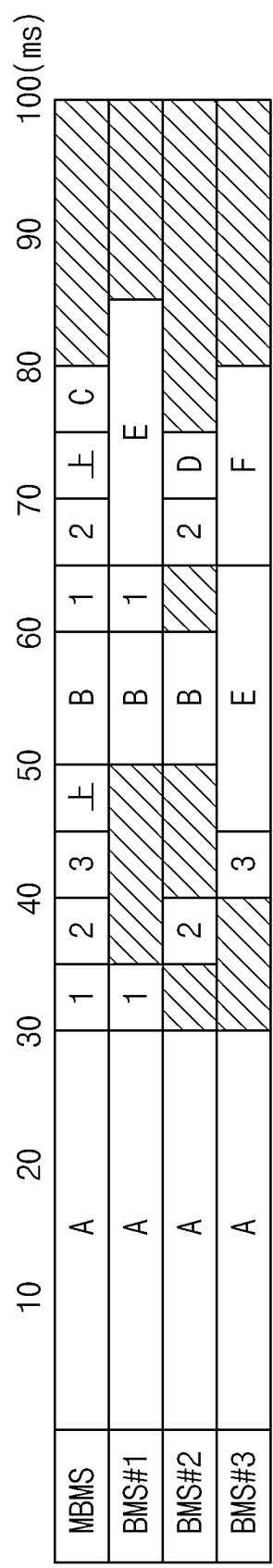
FIG. 9 is a timing diagram showing the order of operation of a task according to FIG. 6 and FIG. 7.

FIG. 9 is a timing diagram showing the order of operation of a task on the basis of the task timetable 121 and the communication priority table 123 according to FIG. 6 and FIG. 7. FIG. 9 may illustrate the state of a task queue while including communication time and a waiting period of time between tasks.

Referring to FIG. 9, A to F show a period of time during which each task is performed. 1 to 3 indicate a communication period of time during which each node transmits data to the master BMS 20, and the Chinese character '上' indicates a communication period of time during which the master BMS 20 transmits data to the higher-level controller 2. The hatching mark indicates the waiting time.

The master BMS 20 performs Task A in synchronization with another node for 0 to 30 ms. Thereafter, for 30 to 45 ms, the master BMS 20 sequentially receives data such as result information on Task A from the BMS #1 14-1 to the BMS #3 14-3. In addition, finally, the master BMS 20 transmits data on Task A to the higher-level controller for 45 to 50 ms. In the same manner, the master BMS 20 sequentially performs performance and communication for Task B, and becomes in a standby state for 80 to 100 ms after performing Task C.

The BMS #1 14-1 performs Task A in synchronization with another node for 0 to 30 ms. Thereafter, for 30 to 35 ms, the BMS #1 14-1 transmits data such as result information on Task A to the master BMS 20. The BMS #1 14-1 becomes in a standby state for 35 to 50 ms, and then performs Task B in synchronization for 50 to 60 ms. After performing Task B, the BMS #1 14-1 transmits data such as result information on Task C to the master BMS 20 for 60 to 65 ms. Finally, the BMS #1 14-1 performs Task E for 65 to 85 ms, and becomes in a standby state for the remaining period of time.

The BMS #2 14-2 performs Task A in synchronization with another node for 0 to 30 ms. Thereafter, the BMS #2 14-2 becomes in a standby state for 30 to 35 ms, and for 35 to 40 ms, the BMS #2 14-2 transmits data such as result information on Task A to the master BMS 20. The BMS #2 14-2 becomes in a standby state again for 40 to 50 ms, and performs Task B in synchronization for 50 to 60 ms. After performing Task B, the BMS #2 14-2 becomes in a standby state for 60 to 65 ms, and transmits data such as result information on Task C to the master BMS 20 for 65 to 70 ms. Finally, the BMS #2 14-2 performs Task D for 70 to 75 ms, and becomes in a standby state for the remaining period of time.

Lastly, the BMS #3 14-3 also performs Task A in synchronization with another node for 0 to 30 ms. Thereafter, the BMS #3 14-3 becomes in a standby state for 30 to 40 ms, and for 40 to 45 ms, the BMS #3 14-3 transmits data such as result information on Task A to the master BMS 20. Since the BMS #3 14-3 does not include Task B, the BMS #3 14-3 performs Task E for 45 to 65 ms, and then performs Task F for 65 to 80 ms. Finally, the BMS #3 14-3 becomes in a standby state for 80 to 100 ms, which is the remaining period of time.

As can be seen in FIG. 9, in the case of the work schedule on the basis of the task timetable 121 and the communication priority table 123 according to FIG. 6 and FIG. 7, there is no problem in performing everything on the schedule within a cycle of 100 ms, which is a predetermined period of time.

Figure 10:
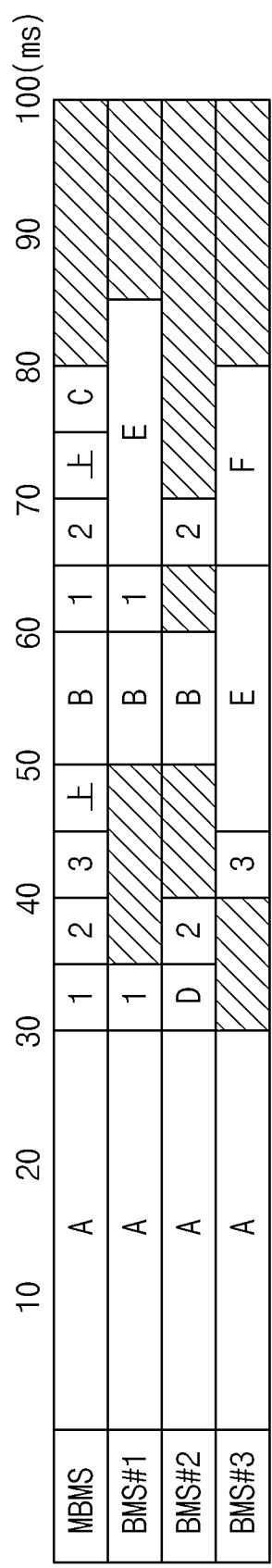
FIG. 10 is a timing diagram showing the order of operation of a task whose work priority has been changed by a battery management system according to an embodiment of the present invention.

However, if necessary, it may be desirable to change the work priority of tasks for the efficient operation of a microprocessor and the like. FIG. 10 is a timing diagram showing the order of operation of a task whose work priority has been changed by a battery management system according to an embodiment of the present invention.

As can be seen in the task timetable 121 and the communication priority table 123 of FIG. 6 and FIG. 7, Task D of the BMS #2 14-2 does not need to be performed in synchronization with another node. In addition, as can be seen in FIG. 9, the BMS #2 14-2 has a waiting time of 30 to 35 ms. Therefore, as can be seen in the timing diagram of the BMS #2 14-2 of FIG. 10, the work priority of Task D may be adjusted to be prior to the work priority of Task B such that Task D may be performed during the waiting time of 30 to 35 ms. To this end, in the task queue, the work priority of Task D may be temporarily adjusted to be prior to the work priority of Task B, and after the completion of performing the tasks, the work priority of the tasks may be adjusted back to the original work priority thereof. Alternatively, in order to allow the work priority of Task D to be prior to the work priority of Task B in the task timetable 121, the table itself may be updated.

FIG. 11 and FIG. 12 are diagrams showing the task timetable 121 and the communication priority table 123 according to another embodiment of the present invention. In the present embodiment, all nodes include both Task A and Task B, and are set to perform the same in synchronization.

According to FIG. 11, the master BMS 20 performs Tasks A, B, and C, and the BMS #1 14-1 performs Tasks A, B, F, G, and H. The BMS #2 14-2 and the BMS #3 14-3 each perform Tasks A, B, D, and E.

In addition, according to FIG. 12, for both Tasks A and B, communication priority is given in the order of BMS #1→BMS #2→BMS #3→ the master BMS.

Hereinafter, a method for adjusting work priority and a work schedule on the basis of the tables of FIG. 11 and FIG. 12 will be described.

Figure 13:
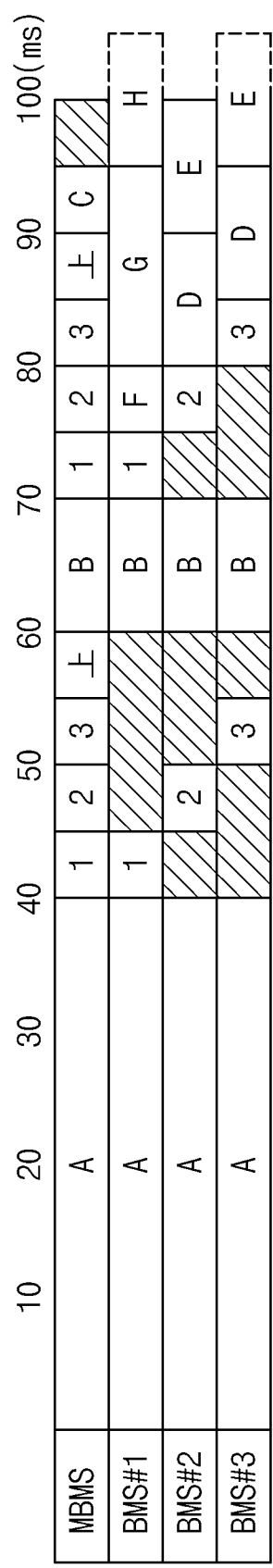
FIG. 13 is a timing diagram showing the order of operation of a task according to FIG. 11 and FIG. 12.

FIG. 13 is a timing diagram showing the order of operation of a task according to FIG. 11 and FIG. 12.

Referring to FIG. 13, it can be seen that the BMS #1 14-1 and the BMS #3 14-3 do not complete all the tasks within a predetermined period of time (for example, a cycle of 100 ms). That is, Task H and Task E are terminated over 100 ms. This is a situation in which an error has occurred in the battery system, and typically, some tasks have to be removed in order to solve the problem. Alternatively, in order to solve the problem, the task timetable 121 and the communication priority table 123 had to be directly modified in its entirety.

However, in the embodiments of the present invention, the above problem may be solved in the following manner.

Figure 14:
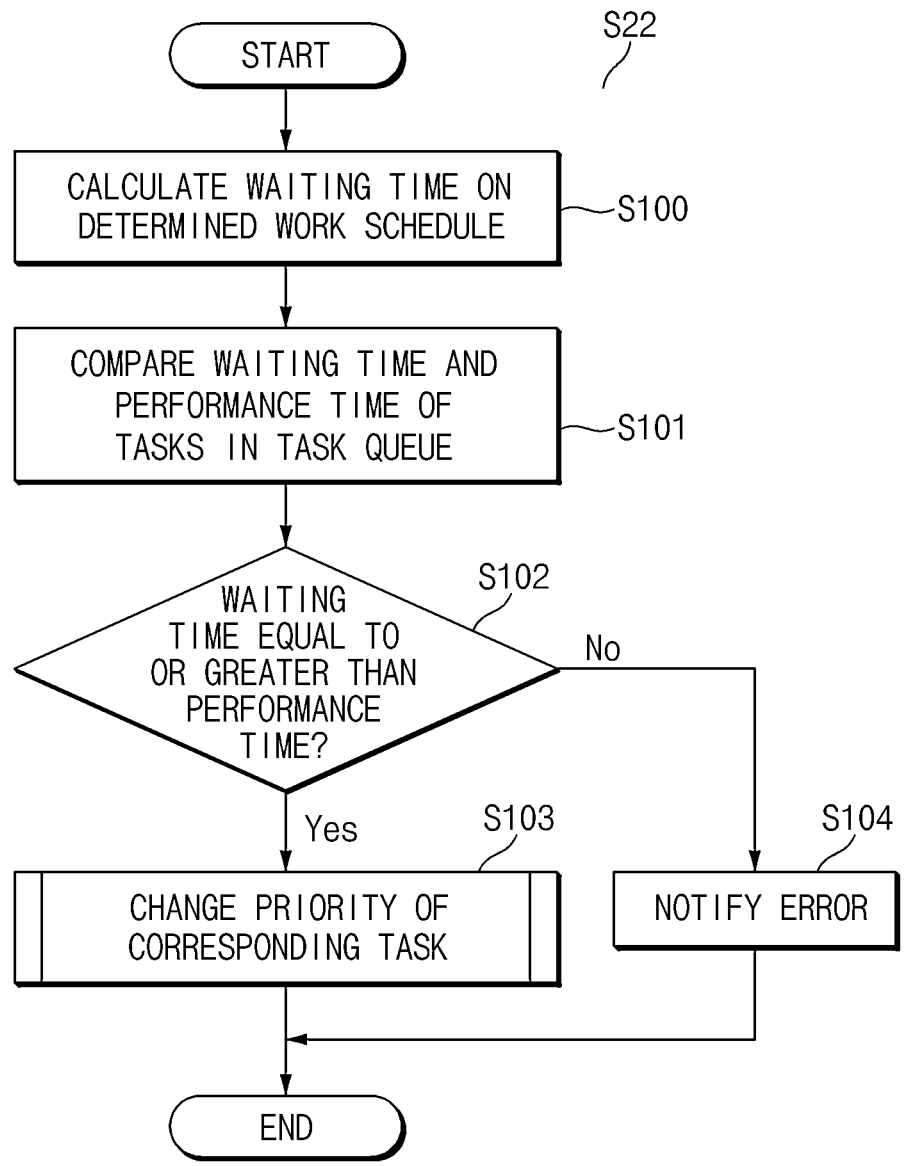
FIG. 14 is a flow chart showing a method for changing work priority according to an embodiment of the present invention.

FIG. 14 is a flow chart showing a method for changing work priority according to an embodiment of the present invention. This operation corresponds to the detailed operation of changing the work priority described with reference to S22 of FIG. 8.

Referring to FIG. 14, firstly, a waiting time on the determined work schedule is calculated S100. This may be a portion indicated by hatching in FIG. 13. In addition, the waiting time and the performance time of tasks in the task queue are compared S101.

For example, as can be seen in FIG. 13, in the case of the BMS #1 14-1, a period of time of 15 ms during the waiting time of 45 to 60 ms and the performance time of Tasks F, G and H which do not need to be performed in synchronization among tasks after the waiting time are compared. In the case of the BMS #3 14-3, 10 ms between 40 to 50 ms, which is the waiting time, 5 ms between 55 to 60 ms, and 10 ms between 70 to 80 ms and the performance time of Tasks D and E which do not need to be performed in synchronization among tasks after the waiting time are compared.

Whether there is a task whose performance time is equal to or less than the waiting time among the tasks whose performance time has been compared is determined S102, and if it is determined that there is a task whose performance time is equal to or less than the waiting time, the work priority of the corresponding task is changed S103.

That is, when there is a subordinated task which may be performed during the waiting time of the determined work schedule, the work priority of the corresponding subordinated task may be adjusted to be after the work priority of a task to be performed just before the waiting time.

On the other hand, if it is determined that there is no task whose performance time is equal to or less than the waiting time, it is determined that it is impossible to correct an error, and thus, the error is notified to the higher-level controller 2 and the like S104.

Figure 15:
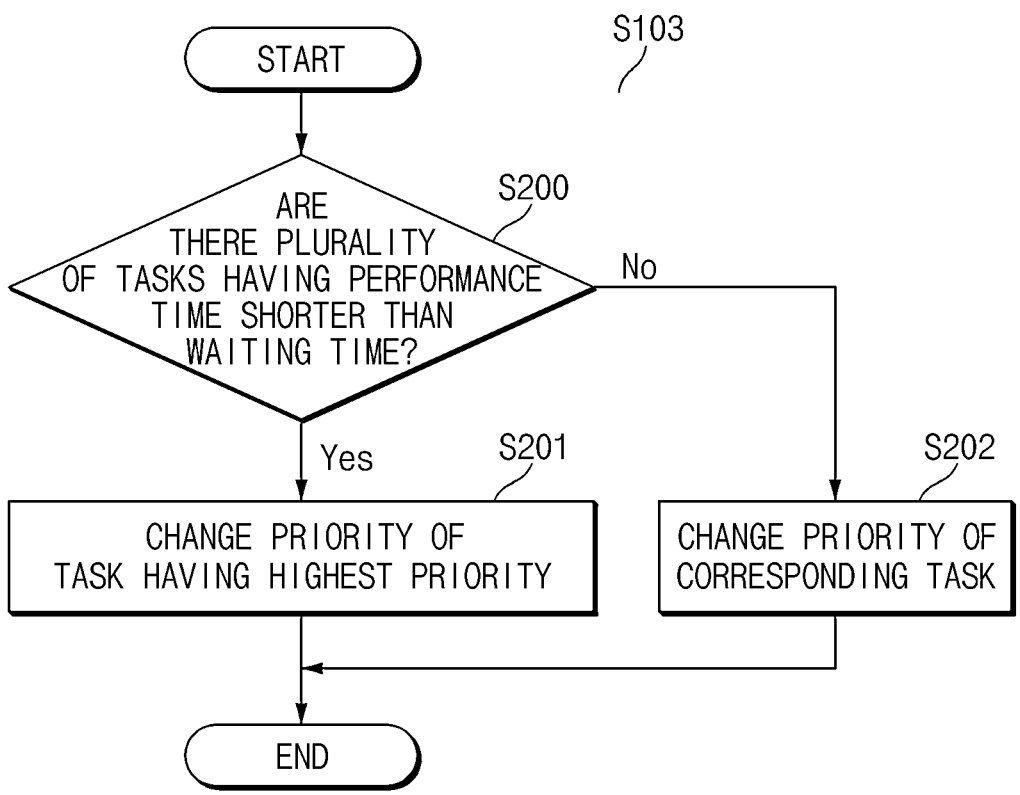
FIG. 15 is a flow chart showing an example of a method for changing work priority according to an embodiment of the present invention.
Figure 16:
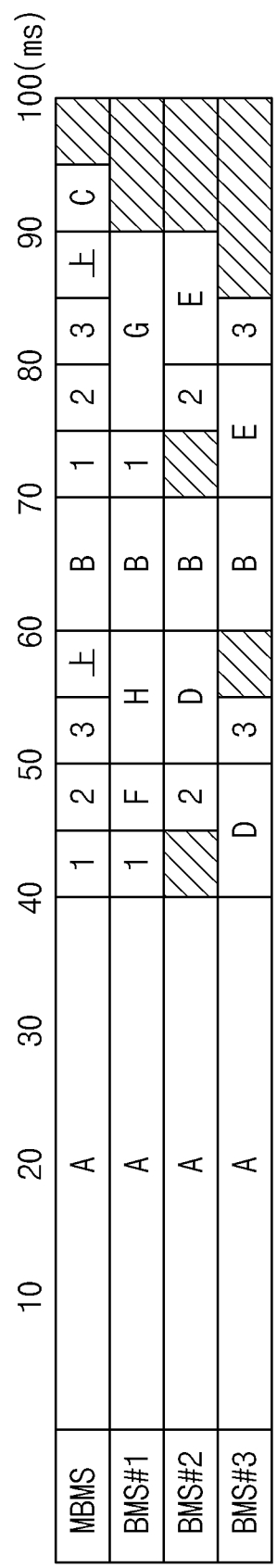
FIG. 16 is a timing diagram showing the order of operation of a task whose work priority has been changed by the method for changing work priority according to FIG. 15.

FIG. 15 is a flow chart showing an example of a method for changing work priority according to an embodiment of the present invention. This operation corresponds to the detailed operation of changing the work priority described with reference to S103 of FIG. 15. FIG. 16 is a timing diagram showing the order of operation of a task whose work priority has been changed by the method for changing work priority according to FIG. 15.

Referring to FIG. 15, firstly, whether there are a plurality of tasks having a performance time shorter than the length of a waiting time is determined S200. When there are a plurality of tasks having a performance time shorter than the length of a waiting time (Yes in S200), the work priority of a task having the highest work priority among the corresponding tasks is adjusted.

As can be seen in FIG. 16, Tasks F, G and H of BMS #1 14-1 have a performance time shorter than a waiting time of 15 ms long in 45 to 60 ms. In addition, Task F has the highest work priority. Therefore, the work priority is adjusted such that Task F is first performed during the waiting time of 45 to 50 ms. Even thereafter, a waiting time of 10 ms long in 50 to 60 ms remains, and since Task H has a performance time of 10 ms, the work priority is adjusted such that Task H is performed during the corresponding waiting time. In addition, with the adjustment of the work priority, Task G may perform tasks for a duration between 75 and 90 ms with a schedule which is 5 ms ahead of the previous one.

Also, in the case of BMS #3 14-3, the work priority is first adjusted such that Task D having the highest work priority is performed during a waiting time of 40 to 50 ms, and the work priority is adjusted such that Task E is performed during a waiting time of 70 to 80 ms.

In addition, although the BMS #2 14-2 is capable of processing all the tasks within the predetermined period of time, the work priority of Task D may be adjusted for the efficient operation of a microprocessor. However, in the case of Task E, only the work schedule is adjusted. That is, in the case of Task E, the work priority thereof is not adjusted. Only the start and end timing thereof are adjusted.

Meanwhile, when there is one task having a performance time shorter than the length of a waiting time (No in S200), the work priority of the corresponding task is adjusted.

Figure 17:
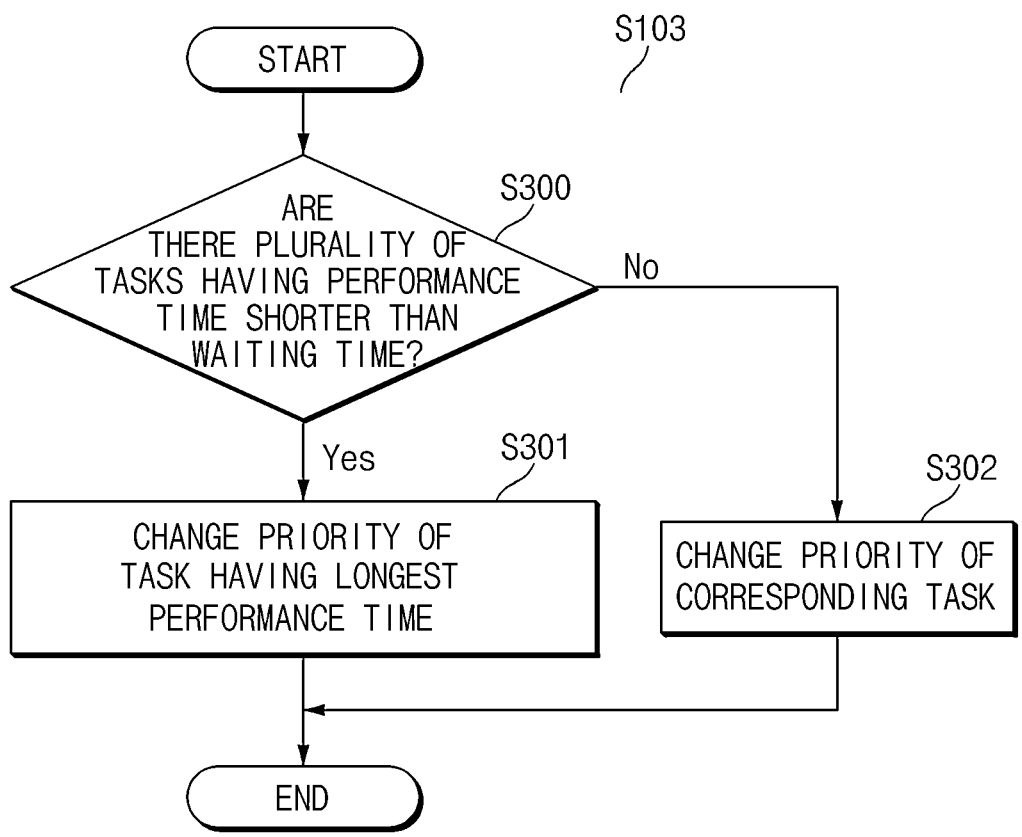
FIG. 17 is a flow chart showing another example of a method for changing work priority according to an embodiment of the present invention.
Figure 18:
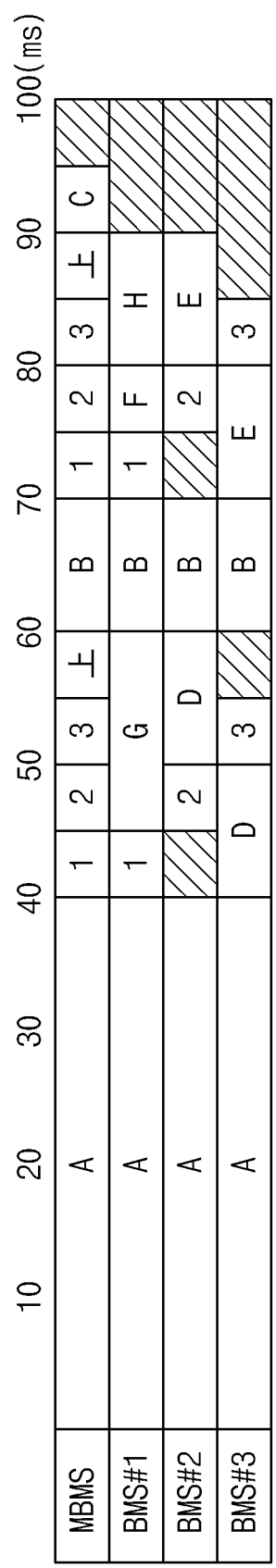
FIG. 18 is a timing diagram showing the order of operation of a task whose work priority has been changed by the method for changing work priority according to FIG. 17.

FIG. 17 is a flow chart showing another example of a method for changing work priority according to an embodiment of the present invention. This operation corresponds to another detailed operation of changing the work priority described with reference to S103 of FIG. 15. FIG. 18 is a timing diagram showing the order of operation of a task whose work priority has been changed by the method for changing work priority according to FIG. 17.

Referring to FIGS. 17, S300 and S302 are the same as S200 and S202 of FIG. 15.

On the other hand, when there are a plurality of tasks having a performance time shorter than the length of the waiting time, in the present embodiment, the work priority of a task having the longest performance time among the corresponding tasks is adjusted S201.

As can be seen in FIG. 18, Tasks F, G and H of BMS #1 14-1 have a performance time shorter than a waiting time of 15 ms long in 45 to 60 ms. In addition, Task G has the longest performance time. Therefore, the work priority is adjusted such that Task G is first performed during the waiting time of 45 to 50 ms. Thereafter, a waiting time of 80 to 95 ms, which is time during which Task G performs a task, remains, and the work priority is adjusted such that Task H is performed for 80 to 90 ms. However, in the case of Task G, the work priority thereof is not adjusted. Only the start and end timing thereof are adjusted.

In the cases of the BMS #2 14-2 and the BMS #3 14-3, Task D and Task E have the same performance time after the waiting time, so that the work priority and the work schedule are adjusted as in the example of FIG. 15 and FIG. 16.

As described above, by allowing the priority to be arbitrarily adjusted among tasks performed after the waiting time, it is possible to process tasks which typically have not been all processed within a predetermined period of time, so that it is possible to efficiently operate hardware.

FIG. 19 is a diagram showing a task timetable according to another embodiment of the present invention.

According to FIG. 19, the master BMS 20 performs Tasks A, B, and C, and the BMS #1 14-1 performs Tasks A, B, F, and G. The BMS #2 14-2 and the BMS #3 14-3 each perform Tasks A, B, D, and E. In the present embodiment, communication priority is as shown in FIG. 12.

Figure 20:
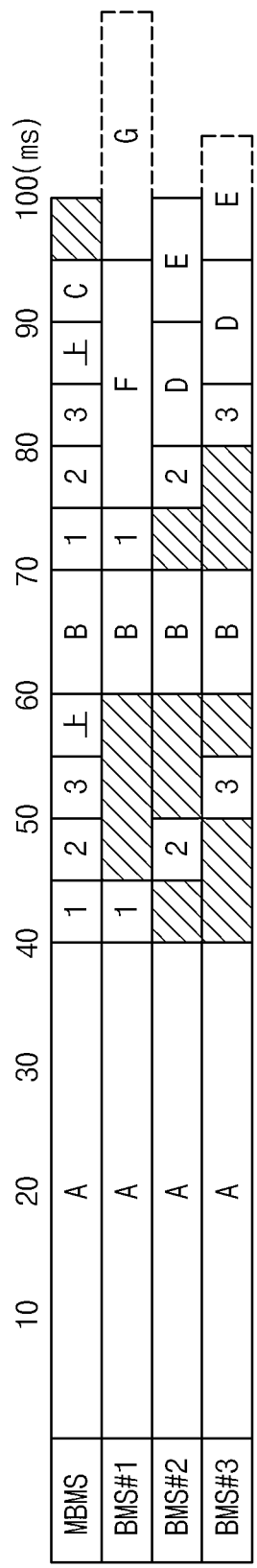
FIG. 20 is a timing diagram showing the order of operation of a task according to FIG. 19 and FIG. 12.

FIG. 20 is a timing diagram showing the order of operation of a task according to FIG. 19 and FIG. 12.

Referring to FIG. 20, it can be seen that the BMS #1 14-1 and the BMS #3 14-3 do not complete all the tasks within a predetermined period of time (for example, a cycle of 100 ms). That is, Task G and Task E are terminated over 100 ms. This is a situation in which an error has occurred in the battery system, and typically, some tasks have to be removed in order to solve the problem. Alternatively, in order to solve the problem, the task timetable 121 and the communication priority table 123 had to be directly modified in its entirety.

However, in the embodiments of the present invention, the above problem may be solved in the following manner which is different to the above-described manner.

Figure 21:
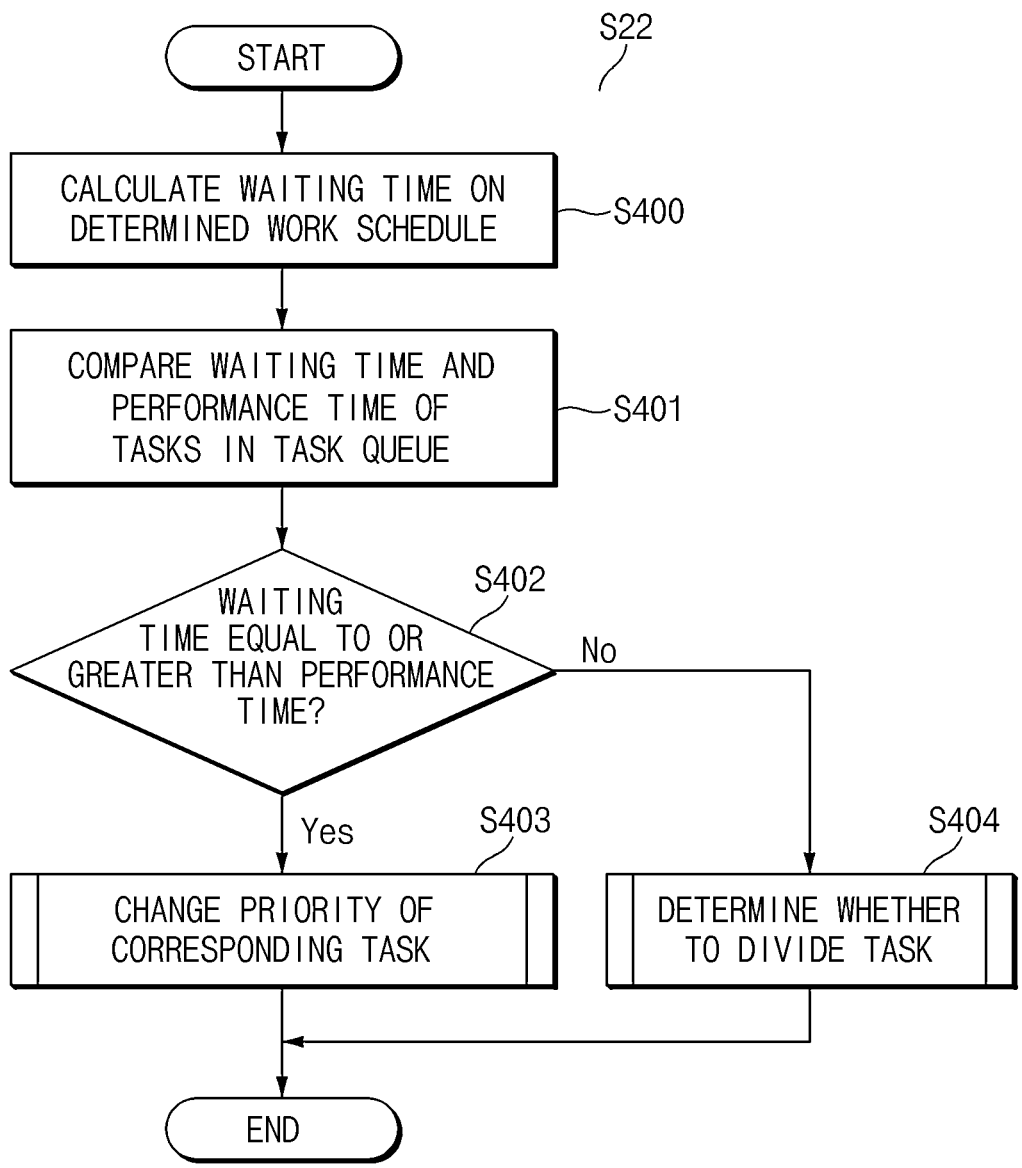
FIG. 21 is a flow chart showing a method for changing work priority according to another embodiment of the present invention.

FIG. 21 is a flow chart showing a method for changing work priority according to another embodiment of the present invention. This operation corresponds to another detailed operation of changing the work priority described with reference to S22 of FIG. 8.

Referring to FIG. 21, the operations of S400 to S403 are the same as the operations of S100 to S103 of FIG. 14. That is, if it is possible to process all the tasks within a cycle, the tasks are performed according to the determined work schedule. In addition, if it is not possible to process all the tasks within a cycle and there is a task having a performance time shorter than a waiting time, the work priority of the corresponding task is adjusted to allow all the tasks to be processed within the cycle.

On the other hand, when there is no task having a performance time shorter than a waiting time (No in S402), whether it is possible to divide the task is determined S404.

Figure 22:
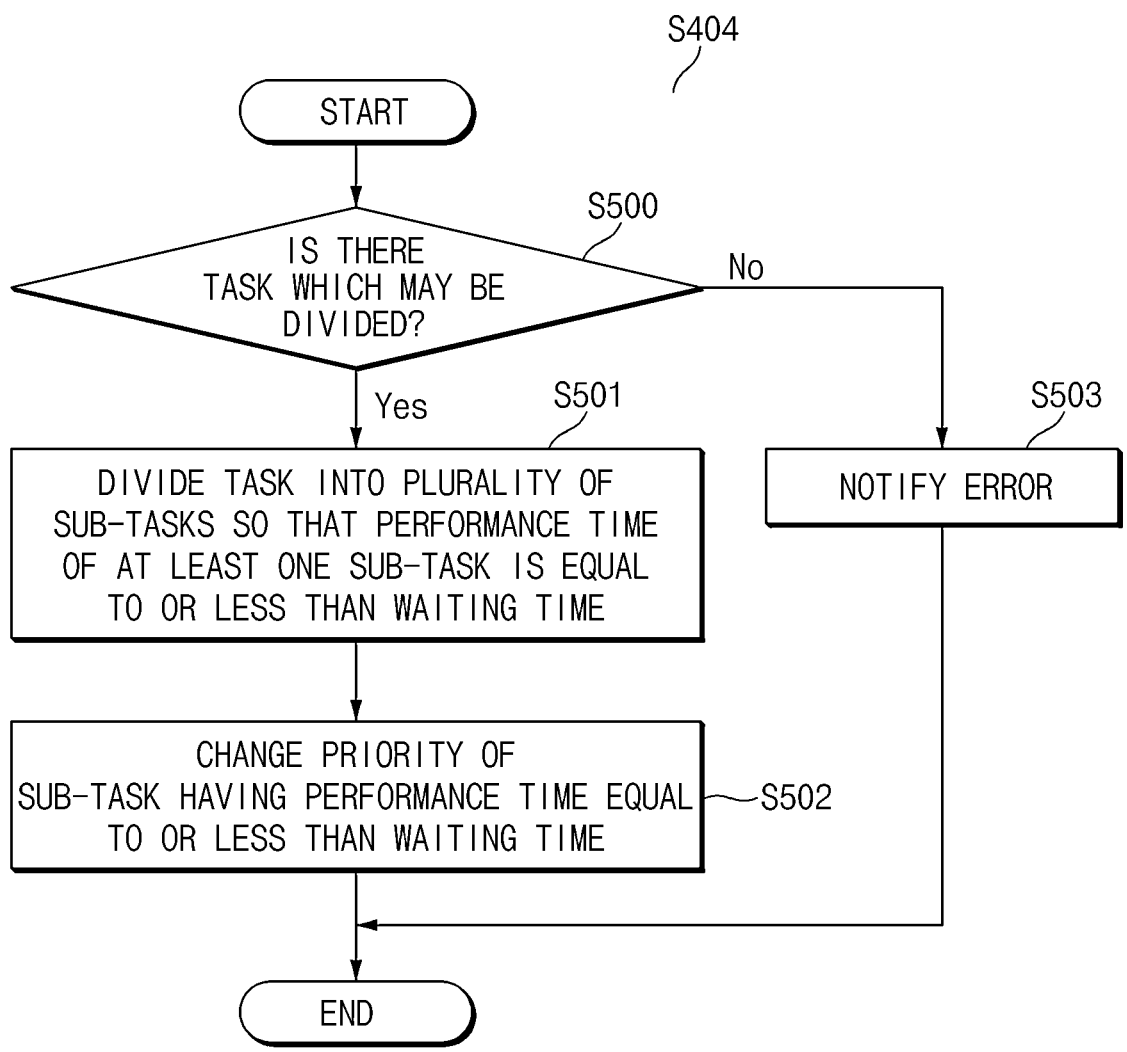
FIG. 22 is a flow chart showing an example of the method for changing work priority according to FIG. 21.

FIG. 22 is a flow chart showing an example of the method for changing work priority according to FIG. 21.

Referring to FIG. 22, since a task having a performance time shorter than a waiting time is not included in a task queue, it is necessary to devise another method to process tasks within a cycle. To this end, whether there is a task which may be divided and performed among tasks included in the task queue is determined S500.

When there is a task which may be divided and performed (Yes in S500), the corresponding task is divided into a plurality of sub-tasks. At this time, the performance time of at least one sub-task is set to be equal to or less than a waiting time S501.

Thereafter, the work priority of the sub-task divided to have a performance time equal to or less than the waiting time is changed S502. Therefore, by allowing the sub-task to be performed during the waiting time, it is possible to process all the tasks within a predetermined period of time.

Meanwhile, when there is no task which may be divided and performed among tasks included in the task queue, it is not possible to process all the tasks within the predetermined period of time, so that an error is notified to the higher-level controller 2 and the like S503.

Figure 23:
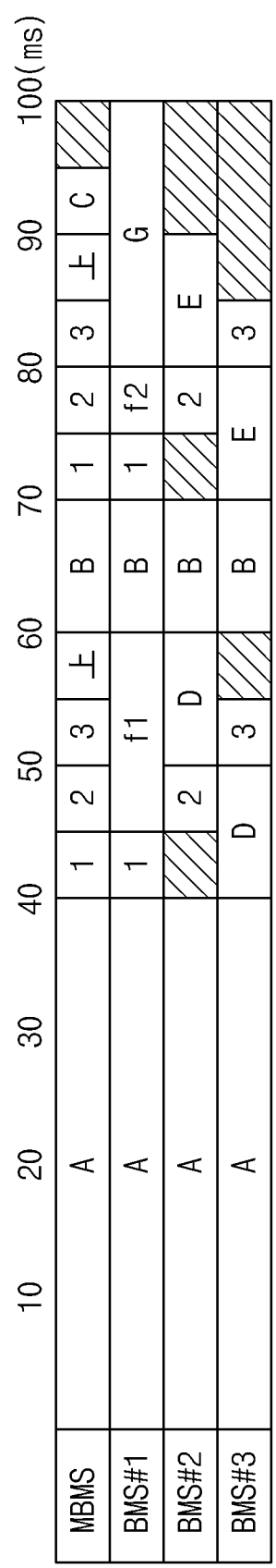
FIG. 23 is a timing diagram showing the order of operation of a task whose work priority has been changed by the method for changing work priority according to FIG. 22.

FIG. 23 is a timing diagram showing the order of operation of a task whose work priority has been changed by the method for changing work priority according to FIG. 22.

As can be seen in FIG. 23, the BMS #1 14-1 is performed after a waiting time, and it is possible to divide Task F between Tasks F and G which do not need to be performed in synchronization. Task F may be divided into two tasks of Sub-tasks f1 and f2. In the present embodiment, both f1 and f2 have a performance time equal to or less than the waiting time. However, it is also possible that only at least one sub-task has a performance time equal to or less than the waiting time. At this time, the at least one sub-task may be divided to have a performance time of the same length as the waiting time. That is, Sub-task f1 is divided to have a performance time of 15 ms so as to be performed for 45 to 60 ms, which is the waiting time of the BMS #1 14-1. In addition, Sub-task f2 is generated having a performance time of 5 ms for the remainder. The work priority of Sub-task f1 is adjusted to be performed before Task B, and thus, a task is performed for 45 to 60 ms, which is the waiting time. As a result, a task of a length exceeding the predetermined period of time may be performed during the waiting time, so that it is possible to perform all the tasks within the predetermined period of time.

Figure 24:
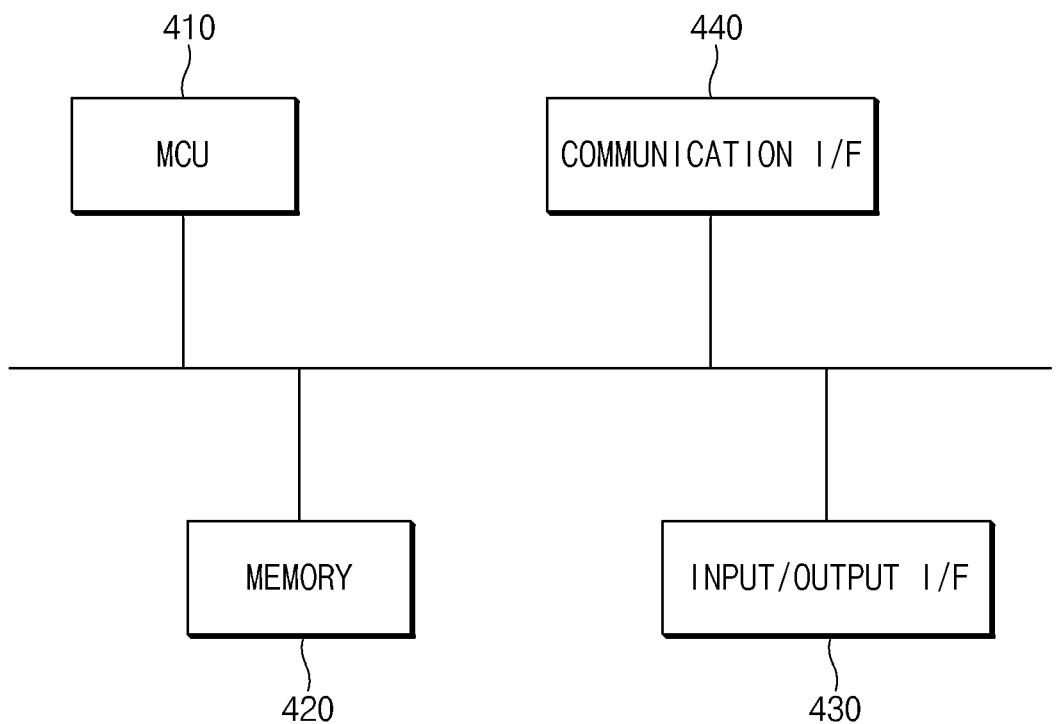
FIG. 24 is a hardware configuration diagram of a battery management system according to an embodiment of the present invention.

FIG. 24 is a hardware configuration diagram of a battery management system according to an embodiment of the present invention.

Referring to FIG. 24, a BMS 400 may include a controller (MCU) 410, a memory 420, an input/output interface 430, and a communication interface 440.

The MCU 410 controls various operations, calculation processing, and each component in the BMS 400.

The memory 420 stores an operating system program and a program for performing the function of the BMS 400. The memory 420 may include a volatile memory and/or a non-volatile memory. For example, as the memory 420, at least one of various storage media such as a semiconductor memory such as a RAM, a ROM, and a flash memory, a magnetic disk, and an optical disk may be used.

The input/output interface 430 performs the input and output of various input signals and output signals. For example, the MCU 410 may output a control signal for the switching operation of a switching element through the input/output interface 430.

The communication interface 440 is a component capable of communicating with the outside in a wired and/or wireless manner.

The MCU 410 may execute the program stored in the memory 420 to implement a module for performing the functions of the schedule determination unit 130, the priority changing unit 140, the work performance unit 150, the synchronization unit 160, and the error calculation unit 170.

In addition, the MCU 410 may perform the function of the communication unit 110 in cooperation with the communication interface 440.

In the above, all the components constituting the embodiments of the present invention have been described as being combined into one or combined to operate as one, but the present invention is not necessarily limited to these embodiments. That is, if within the scope of the present invention, all the components may be selectively combined into one or more to operate.

In addition, the terms "include," "consist," or "have" as described above mean that a corresponding component may be intrinsic, unless specifically stated otherwise, and it should interpreted as including other components rather than excluding other components. All terms including technical or scientific terms may be interpreted as having the same meanings as those commonly understood by those skilled in the art to which the present invention pertains, unless defined otherwise. Terms commonly used as those defined in a commonly used dictionary should be construed as being consistent with the context of the relevant art, and are not to be construed in an idealized or overly formal sense unless expressly defined in the present invention.

The above description is merely illustrative of the technical idea of the present invention, and those skilled in the art to which the present invention pertains may make various modifications and variations without departing from the essential characteristics of the present invention. Therefore, the embodiments disclosed in the present invention are not intended to limit the technical spirit of the present invention, but to explain, and the scope of the technical spirit of the present invention is not limited by these embodiments. The scope of protection of the present invention should be construed by the following claims, and all technical concepts within the scope of the present invention should be construed as being included within the scope of the rights of present invention.

The invention claimed is:

1. A battery management system among a plurality of battery management systems configured to perform one or more tasks respectively set, one or more slave battery management systems among the plurality of battery management systems being configured to transmit results of the respectively performed tasks to a master battery management system among the plurality of battery management systems via wireless communication, the battery management system comprising:

a memory configured to store data including a list of tasks to be performed by each of the plurality of battery management systems, a performance time, a performance cycle, and a work priority of each task included in the list of tasks, and a communication priority among the plurality of battery management systems; and a controller configured to:

determine a work schedule based on the data stored in the memory;

compare a length of a waiting time in the determined work schedule with a length of the performance time of each task to be performed after the waiting time;

if the compared length of the performance time of a task is shorter than the length of the waiting time, adjust the work priority of the task so that the task is to be performed during the waiting time, and adjust the work schedule according to the adjusted work priority; and perform the list of tasks for the battery management system based on the adjusted work schedule.

2. The battery management system of claim 1, wherein, if a plurality of tasks to be performed after the waiting time are determined to have a performance time shorter than the length of the waiting time, the controller is further configured to adjust the work priority of a task having the highest work priority among the plurality of tasks.

3. The battery management system of claim 1, wherein, if a plurality of tasks to be performed after the waiting time are determined to have a performance time shorter than the length of the waiting time, the controller is further configured to adjust the work priority of a task having the longest performance time among the plurality of tasks.

4. The battery management system of claim 1, wherein the list of tasks includes tasks that are set to be performed in synchronization with another battery management system among the plurality of battery management systems.

5. The battery management system of claim 4, wherein the controller is further configured to determine the work schedule in consideration of the tasks to be performed in synchronization.

6. The battery management system of claim 4, wherein, among the tasks in the task list, the controller is configured to perform a task to be commonly performed by the plurality of battery management systems in synchronization.

7. The battery management system of claim 1, wherein the waiting time is a period of time from when a specific task is performed before when results of the performed task are transmitted to another battery management system.

8. The battery management system of claim 1, further comprising a communication interface configured to communicate with the master battery management system or another battery management system among the plurality of battery management systems.

9. The battery management system of claim 8, wherein, when the work priority of a task has been adjusted by the controller, the communication interface is further configured to transmit the work schedule adjusted by the controller to another battery management system among the plurality of battery management systems.

10. The battery management system of claim 8, wherein, when an adjusted work schedule is received from the master battery management system or another battery management system, among the plurality of battery management systems, through the communication interface, the data stored in the memory are updated with the received adjusted work schedule.

11. The battery management system of claim 8, wherein the communication interface is further configured to transmit the work schedule adjusted by the controller to another battery management system in a multi-cast or broadcast manner.

12. The battery management system of claim 1, further comprising:

a task queue configured to store tasks called based on the work schedule determined by the controller, wherein the controller is further configured to change the work priority of a task having a performance time shorter than a waiting time among tasks excluding a task having the highest work priority among tasks included in the task queue.

13. The battery management system of claim 12, wherein, when the task with the changed work priority is completed, the controller is further configured to change the work priority of the corresponding task back to the original work priority thereof.

14. The battery management system of claim 1, wherein the list of tasks for the battery management system includes controlling charging or discharging of a battery cell module.

15. A control method of a battery management system among a plurality of battery management systems configured to perform respective tasks, the method comprising:

storing data including a list of tasks to be performed by each of the plurality of battery management systems, a performance time, a performance cycle, and a work priority of each task included in the list of tasks, and a communication priority among the plurality of battery management systems;

determining a work schedule based on the stored data;

comparing a length of a waiting time in the determined work schedule with a length of the performance time of each task to be performed after the waiting time;

if the compared length of the performance time of a task is shorter than the length of the waiting time, adjusting the work priority of the task so that the task is to be performed during the waiting time;

adjusting the work schedule according to the adjusted work priority; and performing the list of tasks for the battery management system based on the adjusted work schedule.

16. The method of claim 15, wherein the adjusting of the work priority includes, if a plurality of tasks to be performed after the waiting time are determined to have a performance time shorter than the length of the waiting time, adjusting the work priority of a task having the highest work priority among the plurality of tasks.

17. The method of claim 15, wherein the adjusting of the work priority includes, if a plurality of tasks to be performed after the waiting time are determined to have a performance time shorter than the length of the waiting time, adjusting the work priority of a task having the longest performance time among the plurality of tasks.

18. The method of claim 15, wherein the list of tasks for the battery management system includes controlling charging or discharging of a battery cell module.

19. A battery pack comprising:

the battery management system of claim 1; and the other battery management systems among the plurality of battery management systems.

* * * * *